United States Patent
Kanno et al.

(10) Patent No.: US 8,599,030 B2
(45) Date of Patent: Dec. 3, 2013

(54) COMMUNICATION APPARATUS, CONNECTION CONTROL METHOD FOR COMMUNICATION APPARATUS AND METHOD OF DETERMINING STATE OF COMMUNICATION PLUG RELATIVE TO COMMUNICATION CONNECTOR IN COMMUNICATION APPARATUS

(75) Inventors: Minoru Kanno, Tokyo (JP); Kazuo Nakazawa, Tokyo (JP)

(73) Assignee: Oki Data Corporation, Tokyo (JP)

( * ) Notice: Subject to any disclaimer, the term of this patent is extended or adjusted under 35 U.S.C. 154(b) by 713 days.

(21) Appl. No.: 12/801,469

(22) Filed: Jun. 10, 2010

(65) Prior Publication Data

US 2010/0328087 A1 Dec. 30, 2010

(30) Foreign Application Priority Data

Jun. 28, 2009 (JP) ................................. 2009-153076

(51) Int. Cl.
G08B 21/00 (2006.01)
H03D 1/00 (2006.01)
H03K 5/00 (2006.01)

(52) U.S. Cl.
USPC ........... 340/660; 340/661; 340/662; 340/663; 327/50

(58) Field of Classification Search
USPC .................... 340/660, 661, 662, 663; 327/50
See application file for complete search history.

(56) References Cited

U.S. PATENT DOCUMENTS

| 6,095,851 | A  | * | 8/2000 | Laity et al. | 439/490 |
| 6,429,779 | B1 | * | 8/2002 | Petrillo et al. | 340/644 |
| 6,950,779 | B2 | * | 9/2005 | Minatani | 702/182 |
| 7,271,597 | B2 | * | 9/2007 | Takano | 324/538 |
| 7,812,737 | B1 | * | 10/2010 | Hunter | 340/687 |
| 8,246,397 | B2 | * | 8/2012 | Jacks et al. | 439/676 |
| 8,412,268 | B2 | * | 4/2013 | Inha et al. | 455/557 |
| 2007/0105415 | A1 | * | 5/2007 | Jin et al. | 439/122 |
| 2008/0299819 | A1 | * | 12/2008 | Kakutani | 439/489 |

FOREIGN PATENT DOCUMENTS

| JP | A-2002-199044 | 7/2002 |
| JP | A-2003-115895 | 4/2003 |
| JP | A-2009-130680 | 6/2009 |

* cited by examiner

Primary Examiner — Daniel Wu
Assistant Examiner — Emily C Terrell
(74) Attorney, Agent, or Firm — Muncy, Geissler, Olds & Lowe, PLLC

(57) ABSTRACT

A communication apparatus includes a communication connector, a communication section, a connection section, a state detector, a controller and a warning section. The communication section controls communication performed through the communication connector, to which a communication plug is connected. The connection section connects the communication connector and the communication section. The state detector generates a state detection signal corresponding to a connection state of the communication plug relative to the communication connector. The controller determines which of a normal connection state, an improper connection state and a non-connection state the communication plug is in based on the state detection signal. The controller also controls an ON-OFF operation of the connection section. The warning section notifies a user of results determined by the controller.

19 Claims, 15 Drawing Sheets

| STATE DETECTION SIGNAL | : SD1 SD2 |
|---|---|
| NORMAL CONNECTION STATE | : 2.5 V  0 V |
| NON-CONNECTION STATE | : 2.5 V  0.39 V |

| STATE DETECTION SIGNAL | : SD1 | SD2 |
|---|---|---|
| NORMAL CONNECTION STATE | : 2.5 V | 0 V |
| NON-CONNECTION STATE | : 2.5 V | 0.39 V |
| IMPROPER CONNECTION STATE | : 2.5 V | 4.76 V |

| STATE DETECTION SIGNAL | : SD1 | SD2 |
|---|---|---|
| NORMAL CONNECTION STATE A | : 0 V | 4.76 V |
| NORMAL CONNECTION STATE B | : 4.76 V | 0 V |
| NON-CONNECTION STATE | : 0.39 V | 0.39 V |
| IMPROPER COMMUNICATION STATE | : 0 V | 0 V |

COMMUNICATION APPARATUS, CONNECTION CONTROL METHOD FOR COMMUNICATION APPARATUS AND METHOD OF DETERMINING STATE OF COMMUNICATION PLUG RELATIVE TO COMMUNICATION CONNECTOR IN COMMUNICATION APPARATUS

CROSS-REFERENCE TO RELATED APPLICATION

This application claims priority based on 35 USC 119 from prior Japanese Patent Application No. P 2009-153076 filed on Jun. 28, 2009, the entire contents of which are incorporated herein by reference.

BACKGROUND

This application relates to a communication apparatus that has multiple interfaces for multiple communication lines, such as a telephone line and a LAN (Local Area Network) line. Moreover, the application also relates to a connection control method performed by the communication apparatus.

A communication apparatus that performs communication through multiple communication lines, such as an ISDN (Integrated Service Digital Network) line and a LAN line, has multiple interfaces corresponding to the respective communication lines. In the communication apparatus, multiple communication connectors corresponding to the respective interfaces are disposed on the same surface of the apparatus to reduce layout space of the connectors. Japanese Patent Laid-Open No. 2003-115895 discloses one such communication apparatus.

In the aforementioned communication apparatus, however, because some communication connectors, such as an ISDN connector and an Ethernet connector, have identical shapes, a network cable plug and a communication connector that are different in standard may be connected by mistake. If the improper connection between the network cable plug and the communication connector, which are different in standard, is made, irregular voltages and signals are provided to pins of the communication connector. This will cause the communication apparatus to malfunction.

SUMMARY

An object of the application is to disclose a communication apparatus and a connection control method performed by the communication apparatus, capable of preventing an improper connection between a communication plug and a communication connector that are different in standard.

According to one aspect, a communication apparatus includes a communication connector, a communication section, a connection section, a state detector, a controller and a warning section. The communication section controls communication performed through the communication connector, to which a communication plug is capable of being connected. The connection section connects the communication connector and the communication section. The state detector generates a state detection signal corresponding to a connection state of the communication plug relative to the communication connector. The controller determines which of a normal connection state, an improper connection state and a non-connection state the communication plug is in based on the state detection signal. The controller also controls an ON-OFF operation of the connection section. The warning section notifies a user of results determined by the controller.

According to another aspect, a connection control method is performed by a communication apparatus that includes a communication connector to which a communication plug is capable of being connected, a communication section that controls communication performed through the communication connector, and a connection section that connects the communication connector and the communication section. The method includes turning off the connection section when the communication apparatus is powered on, generating a state detection signal corresponding to a connection state of the communication plug relative to the communication connector, determining which of a normal connection state, an improper connection state and a non-connection state the communication plug is in based on the state detection signal, notifying a user of results of the determining and turning on the connection section when the results of the determining indicate the normal connection state.

According to yet another aspect, in a communication apparatus that includes a communication connector to which a communication plug is capable of being connected, a communication section that controls communication performed through the communication connector, and a connection section that connects the communication connector and the communication section, a method of determining a state of the communication plug relative to the communication connector includes: receiving a voltage level signal from the communication connector when the communication apparatus is powered on and the connection section is turned off; and generating a state detection signal based on the received voltage level signal. The state detection signal corresponds to one of a normal connection state, an improper connection state and a non-connection state of the communication plug relative to the communication connector, and the state detection signal also enables a type of communication plug to be determined when the communication plug is connected to the communication connector in the improper connection state.

In a further aspect, in a communication apparatus that includes a communication connector to which a communication plug is capable of being connected, a communication section that controls communication performed through the communication connector, and a connection section that connects the communication connector and the communication section, a connection control method includes turning off the connection section when the communication apparatus is powered on; receiving a state detection signal generated in response to a connection state of the communication plug relative to the communication connector; determining which of a normal connection state, an improper connection state and a non-connection state the communication plug is in based on the state detection signal; notifying a user of results of the determining; and turning on the connection section when the results of the determining indicate the normal connection state.

The full scope of applicability of the communication apparatus and the connection control method will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The communication apparatus and the connection control method will become more fully understood from the detailed description given herein and the accompanying drawings, which are given by way of illustration only, and thus do not limit the invention, and wherein.

DETAILED DESCRIPTION

Preferred embodiments of a communication apparatus and a connection control method according to the invention will be described in detail with reference to the accompanying drawings.

First Embodiment

Figure 1:
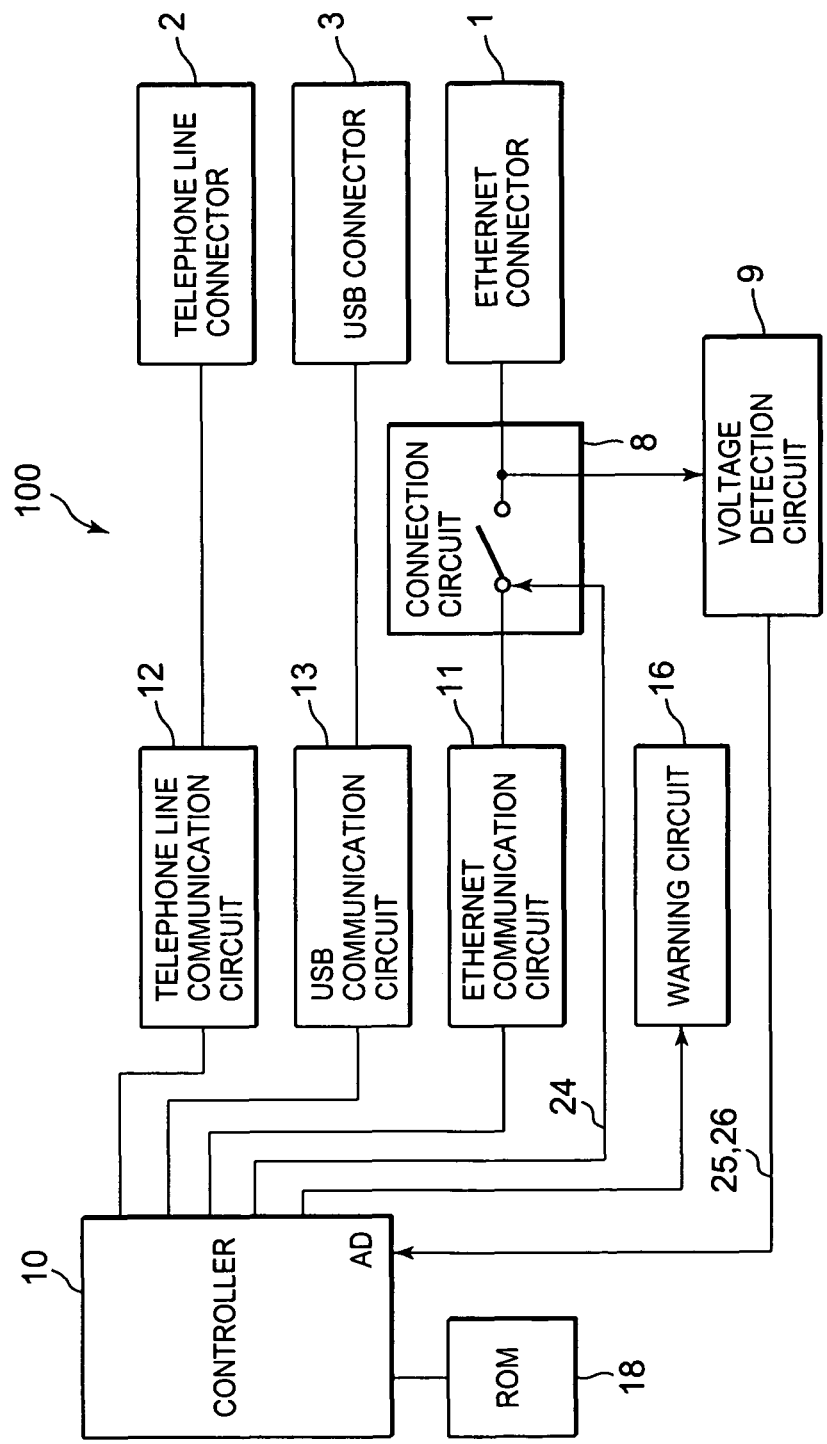
FIG. 1 is a schematic block diagram of a communication apparatus of a first embodiment.

FIG. 1 is a schematic block diagram of a communication apparatus 100 of a first embodiment, which may include an Ethernet connector 1, a telephone line connector 2, a USB (Universal Serial Bus) connector 3, a connection circuit 8, a voltage detection circuit 9, a controller 10, an Ethernet communication circuit 11, a telephone line communication circuit 12, a USB communication circuit 13, a warning circuit 16 and a ROM (Read-Only Memory) 18.

An Ethernet plug 21 (FIG. 3), a telephone line plug 22 (FIG. 5) and a USB plug 23 (FIG. 7), described later, are respectively connected to the Ethernet connector 1, the telephone line connector 2 and the USB connector 3. The connection circuit 8 as a connection section is connected with the Ethernet connector 1, the Ethernet communication circuit 11 and the voltage detection circuit 9 through signal lines. The connection circuit 8 is also directly connected with the controller 10 through an ON-OFF signal line 24. The voltage detection circuit 9 as a state detector is connected with the connection circuit 8 and the controller 10. The voltage detection circuit 9 generates state detection signals that represent a connection state of a communication plug relative to the Ethernet connector 1, i.e., a normal connection state, an improper connection state and a non-connection state, and sends the state detection signals to a terminal AD of the controller 10 through detection signal lines 25 and 26.

The controller 10 is connected with the voltage detection circuit 9, the Ethernet communication circuit 11, the telephone line communication circuit 12, the USB communication circuit 13, the warning circuit 16 and the ROM 18. The Ethernet communication circuit 11 as an Ethernet communication section is connected with the Ethernet connector 1 through signal lines and the connection circuit 8, and controls Ethernet communication performed through the Ethernet connector 1. The telephone line communication circuit 12 as a telephone line communication section is connected with the telephone line connector 2 through signal lines, and controls telephone line communication performed through the telephone line connector 2. The USB communication circuit 13 as a USB communication section is connected with the USB connector 3 through signal lines, and controls USB communication with a USB device. The warning circuit 16 as a warning section may include a buzzer, an LED (Light-Emitting Diode), a lamp, a liquid crystal display panel and the like, and visually or audibly notifies a user of the connection state of the communication plug, i.e., the normal connection state, the improper connection state and the non-connection state, under the control of the controller 10. In addition, the warning circuit 16 also notifies the user of the type of the communication plug when the communication plug is in the improper connection state, as described later.

The ROM 18 as a memory stores various control programs executed by the controller 10. The controller 10 controls the entire communication apparatus 100 and each of the aforementioned elements by using the control programs. The controller 10, for instance, controls an ON-OFF action of the connection circuit 8 through the ON-OFF signal line 24.

Figure 2:
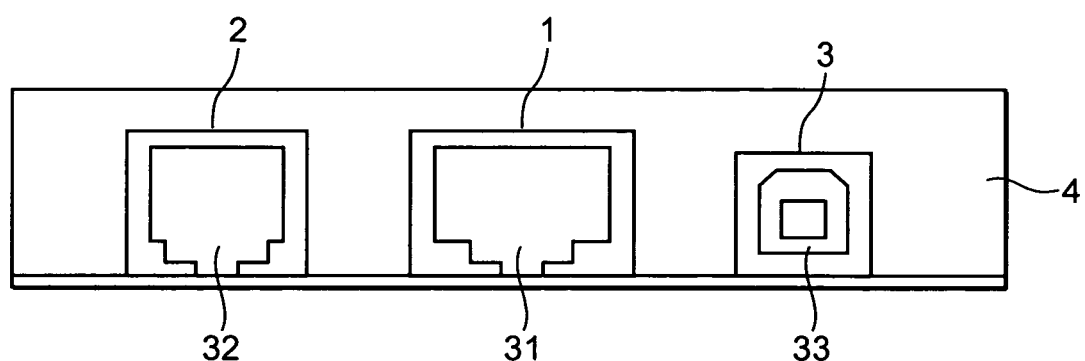
FIG. 2 is a schematic view of a connector installation section in the communication apparatus.

FIG. 2 is a schematic view of a connector installation section 4 in the communication apparatus 100, in which the Ethernet connector 1 for use in the Ethernet communication, the telephone line connector 2 for use in the telephone line communication and the USB connector 3 for use in USB communication are disposed side by side. The Ethernet connector 1, the telephone line connector 2 and the USB connector 3 respectively have an Ethernet plug inlet 31, a telephone line plug inlet 32 and a USB plug inlet 33.

The Ethernet connector 1 may be an RJ (Registered Jack)-45 type communication connector or an 8P8C (8 Positions, 8 Conductor) type communication connector, and the Ethernet plug 21 connected to the Ethernet connector 1 may be an RJ-45 type communication plug or an 8P8C type communication plug. The telephone line connector 2 may be an RJ-11 type communication connector, and the telephone line plug 22 connected to the telephone line connector 2 may be an RJ-11 type communication plug. The USB connector 3 may be a USB-A type communication connector corresponding to a USB-A type communication plug designed for a host computer such as a personal computer, or may be a USB-B type communication connector corresponding to a USB-B type communication plug designed for a peripheral such as a printer. In this embodiment, the USB-B type communication connector and the USB-B type communication plug are respectively used as the USB connector 3 and the USB plug 23.

Figure 3:
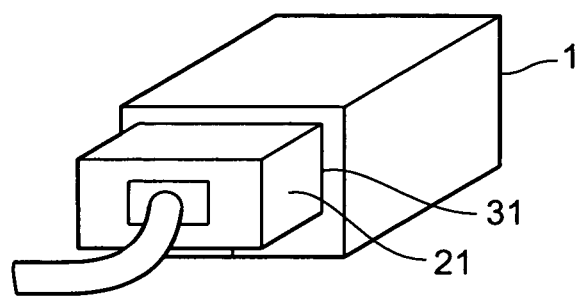
FIG. 3 is a perspective view showing a state where an Ethernet plug is normally connected to an Ethernet connector.

FIG. 3 is a perspective view showing a state where the Ethernet plug 21 is normally connected to the Ethernet connector 1. In FIG. 3, the Ethernet plug 21, which is the 8P8C type communication plug, is normally connected to the Ethernet plug inlet 31 of the Ethernet connector 1.

Figures 4A, 4B:
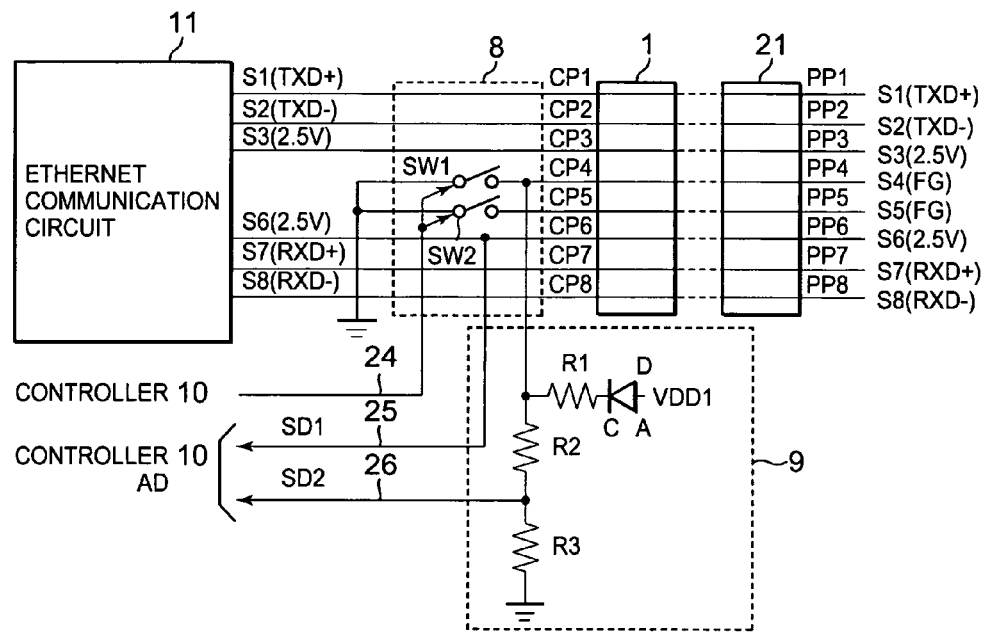
FIG. 4A is a circuit diagram in the state where the Ethernet plug is normally connected to the Ethernet connector.
FIG. 4B is a list showing voltage levels of state detection signals sent on detection signal lines.

FIG. 4A is a circuit diagram in the state where the Ethernet plug 21 is normally connected to the Ethernet connector 1. FIG. 4B is a list showing voltage levels of state detection signals SD1 and SD2, respectively sent on the detection signal lines 25 and 26.

Referring to FIG. 4A, the Ethernet connector 1 has eight pins CP1 to CP8, which are respectively connected with a first signal line S1 (TXD+), a second signal line S2 (TXD−), a third signal line S3 (2.5 V), a fourth signal line S4 (FG), a fifth signal line S5 (FG), a sixth signal line S6 (2.5 V), a seventh signal line S7 (RXD+) and an eighth signal line S8 (RXD−). The first signal line S1 (TXD+) and the second signal line S2 (TXD−) are both data transmission lines. The third signal line S3 (2.5 V) and the sixth signal line S6 (2.5 V) are both power lines providing 2.5 V. The fourth signal line S4 (FG) and the fifth signal line S5 (FG) are both lines connected to ground. The seventh signal line S7 (RXD+) and the eighth signal line S8 (RXD−) are both data reception lines.

Six signal lines including the first signal line S1 (TXD+), the second signal line S2 (TXD−), the third signal line S3 (2.5 V), the sixth signal line S6 (2.5 V), the seventh signal line S7 (RXD+) and the eighth signal line S8 (RXD−) are connected with the Ethernet communication circuit 11. The fourth signal line S4 (FG) and the fifth signal line S5 (FG), which are respectively connected with the pins CP4 and CP5, are respectively grounded through switches SW1 and SW2 of the connection circuit 8. The switches SW1 and SW2 are operated by the controller 10 through the ON-OFF signal line 24. The switches SW1 and SW2 maybe electromagnetic switches, solid-state switches, electromagnetic relays, solid-state relays or the like.

The voltage detection circuit 9 includes a first resistor R1 (1.1 kΩ), a second resistor R2 (10 kΩ), a third resistor R3 (1.1 kΩ), a diode D and a power supply VDD1 (5 V). The fourth signal line S4 (FG), which is connected with the pin CP4 of the Ethernet connector 1, is connected with one end of the first resistor R1 (1.1 kΩ) and one end of the second resistor R2 (10 kΩ). The other end of the first resistor R1 (1.1 kΩ) is connected with a cathode terminal C of the diode D, and an anode terminal A of the diode D is connected with the power supply VDD1 (5 V). The other end of the second resister R2 (10 kΩ) is connected with one end of the third resistor R3 (1.1 kΩ) and one end of the detection signal line 26. The other end of the third resistor R3 (1.1 kΩ) is grounded and the other end of the detection signal line 26 is connected with the terminal AD of the controller 10. The sixth signal line S6 (2.5 V), which is connected with the pin CP6 of the Ethernet connector 1, is led into the voltage detection circuit 9 and connected with the detection signal line 25. The detection signal line 25 is connected with the terminal AD of the controller 10.

It should be noted that when a communication plug that is different in standard from the Ethernet connector 1, such as the telephone line plug 22, is improperly connected to the Ethernet connector 1 and an irregular voltage is provided to the pin CP4 of the Ethernet connector 1, the diode D prevents a reverse current from flowing into the power supply VDD1 (5 V). That is, the diode D serves as a protection element. Also, it should be noted that the first resistor R1 (1.1 kΩ) limits the reverse current. That is, the first resistor R1 (1.1 kΩ) serves as a current-limiting resistor.

The Ethernet plug 21 has eight pins PP1 to PP8, which respectively correspond to the pins CP1 to CP8 of the Ethernet connector 1. Therefore, the pins PP1 to PP8 are respectively connected with the first signal line S1 (TXD+), the second signal line S2 (TXD−), the third signal line S3 (2.5 V), the fourth signal line S4 (FG), the fifth signal line S5 (FG), the sixth signal line S6 (2.5 V), the seventh signal line S7 (RXD+) and the eighth signal line S8 (RXD−).

As described above, the pins CP4 and CP6 are connected with the voltage detection circuit 9. The voltage detection circuit 9 receives voltage level signals corresponding to the connection state of the communication plug relative to the Ethernet connector 1 from the pins CP4 and CP6. The voltage detection circuit 9 generates the state detection signals SD1 and SD2 based on the voltage level signals received from the pins CP4 and CP6, and sends them to the controller 10 through the detection signal lines 25 and 26.

As shown in FIG. 4A, when the Ethernet plug 21 is normally connected to the Ethernet connector 1, the voltage detection circuit 9 sends the state detection signal SD1 that has a voltage level of 2.5 V and the state detection signal SD2 that has a voltage level of 0 V to the controller 10, through the detection signal lines 25 and 26, as shown in FIG. 4B. On the other hand, when the Ethernet plug 21 is not connected to the Ethernet connector 1, the voltage detection circuit 9 sends the state detection signal SD1 that has a voltage level of 2.5 V and the state detection signal SD2 that has a voltage level of 0.39 V to the controller 10, through the detection signal lines 25 and 26, as shown in FIG. 4B. The controller 10 receives the state detection signals SD1 and SD2 from the voltage detection circuit 9 through the detection signal lines 25 and 26, and determines whether the Ethernet plug 21 is normally connected to the Ethernet connector 1 or is not connected to the Ethernet connector 1, based on the voltage levels of the state detection signals SD1 and SD2. Then, the controller 10 sends the results of the determination, i.e., the normal connection state or the non-connection state, to the warning circuit 16, which notifies the user of the determination results.

Figure 5:
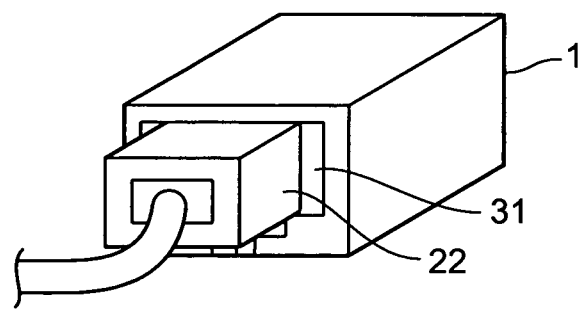
FIG. 5 is a perspective view showing a state where a telephone line plug is improperly connected to the Ethernet connector.
Figures 6A, 6B:
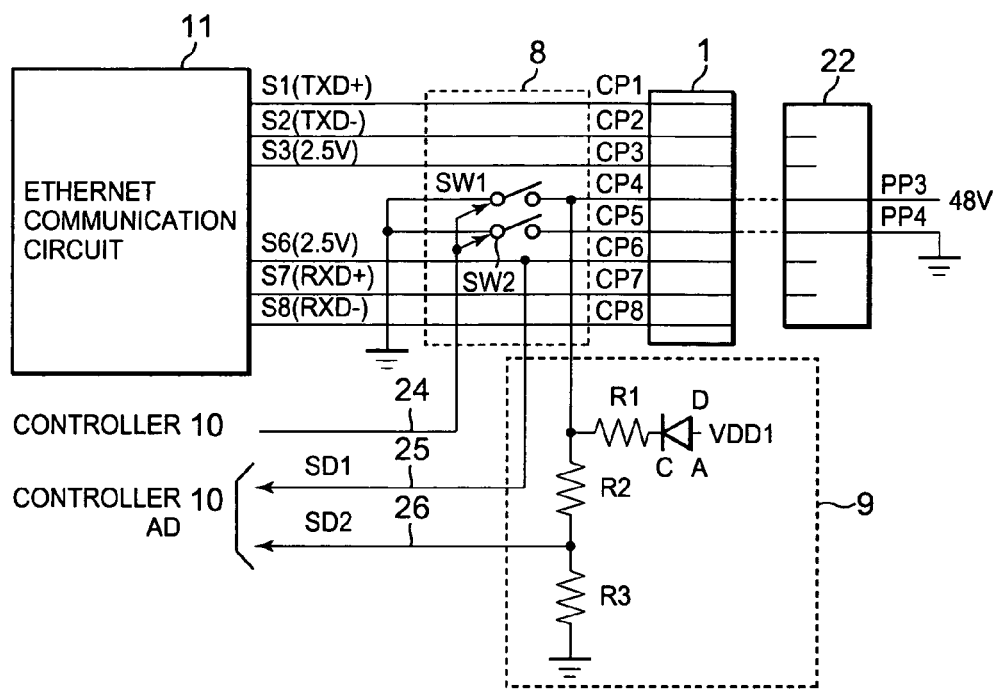
FIG. 6A is a circuit diagram in the state where the telephone line plug is improperly connected to the Ethernet connector.
FIG. 6B is a list showing voltage levels of the state detection signals sent on the detection signal lines.

FIG. 5 is a perspective view showing a state where the telephone line plug 22 is improperly connected to the Ethernet connector 1. In FIG. 5, the telephone line plug 22, which is the typical RJ-11 type communication plug, is improperly connected to the Ethernet plug inlet 31 of the Ethernet connector 1. FIG. 6A is a circuit diagram in the state where the telephone line plug 22 is improperly connected to the Ethernet connector 1. FIG. 6B is a list showing voltage levels of the state detection signals SD1 and SD2, respectively sent on the detection signal lines 25 and 26.

In FIG. 6A, a circuit configuration of the communication apparatus 100 is the same as in FIG. 4A. As shown in FIG. 6A, when the telephone line plug 22 is improperly connected to the Ethernet connector 1, the pins CP4 and CP5 of the Ethernet connector 1 are respectively connected with pins PP3 and PP4 of the telephone line plug 22. The pin PP3 of the telephone line plug 22 is connected with a voice signal line, which provides a telephone with a direct voltage of 48 V for operating the telephone and communicates a voice-band signal superimposed on the direct voltage of 48 V. The pin PP4 of the telephone line plug 22 is connected to ground.

As described above, the voltage detection circuit 9 receives voltage level signals from the pins CP4 and CP6, and generates the state detection signals SD1 and SD2 based on the voltage level signals received from the pins CP4 and CP6. As shown in FIG. 6B, when the telephone line plug 22 is improperly connected to the Ethernet connector 1, the voltage detection circuit 9 sends the state detection signal SD1 that has a voltage level of 2.5 V and the state detection signal SD2 that has a voltage level of 4.76 V to the controller 10, through the detection signal lines 25 and 26.

The controller 10 receives the state detection signals SD1 and SD2 from the voltage detection circuit 9 through the detection signal lines 25 and 26, and determines that the telephone line plug 22 is improperly connected to the Ethernet connector 1, based on the voltage levels of the state detection signals SD1 and SD2. Then, the controller 10 sends the results of determination, i.e., the improper connection state, to the warning circuit 16, which notifies the user of the determination results. At this time, the warning circuit 16 also notifies the user of the type of the communication plug that is improperly connected, that is, TELEPHONE LINE PLUG. In this embodiment, a two-wire telephone line is taken as an example of the telephone line, which is attached to the telephone line plug 22 of the RJ-11 type. However, the telephone line may be a four-wire telephone line or a six-wire telephone line having higher functions.

Figure 7:
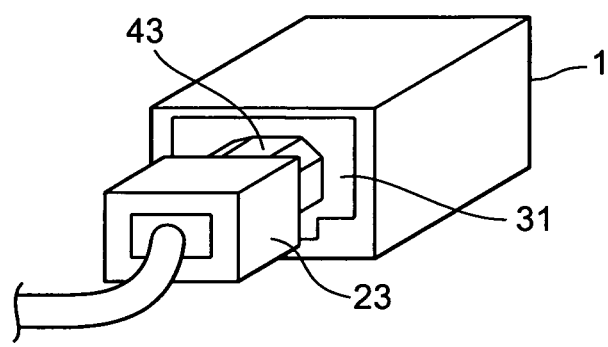
FIG. 7 is a perspective view showing a state where a USB plug is improperly connected to the Ethernet connector.

FIG. 7 is a perspective view showing a state where the USB plug 23 is improperly connected to the Ethernet connector 1. In FIG. 7, a shell 43 of the USB plug 23 of the USB-B type, which meets the USB 1.1 standard, is improperly connected to the Ethernet plug inlet 31 of the Ethernet connector 1.

Figure 8:
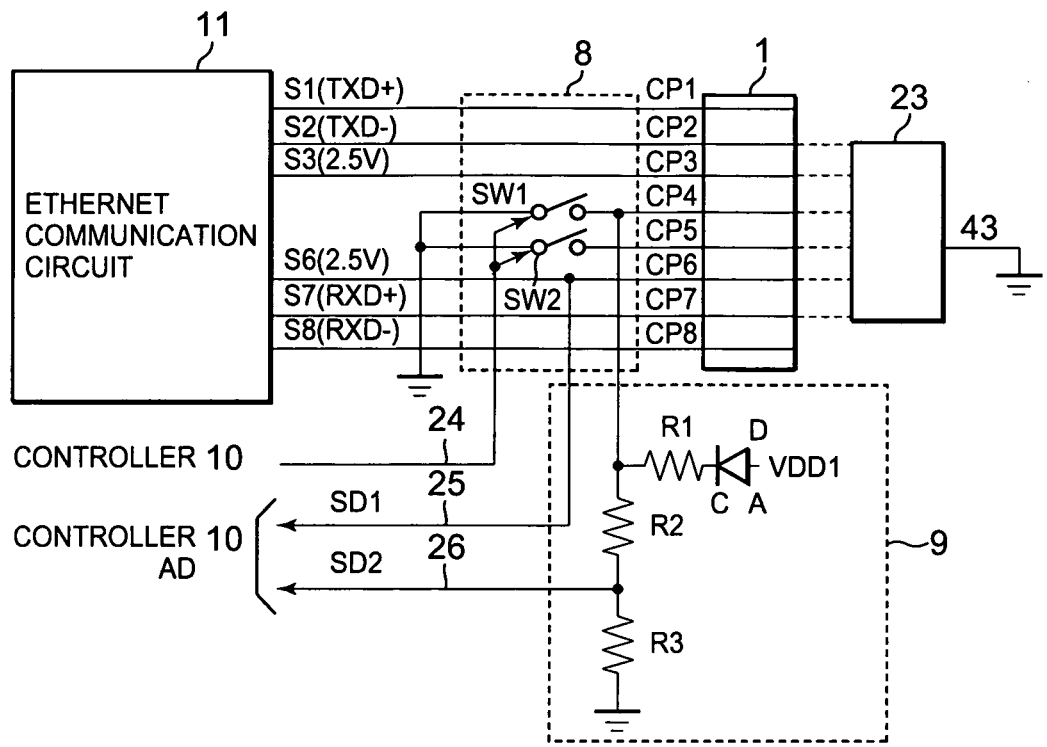
FIG. 8A is a circuit diagram in the state where the USB plug is improperly connected to the Ethernet connector.
FIG. 8B is a list showing voltage levels of the state detection signals sent on the detection signal lines.

FIG. 8A is a circuit diagram in the state where the USB plug 23 is improperly connected to the Ethernet connector 1. FIG. 8B is a list showing voltage levels of the state detection signals SD1 and SD2, respectively sent on the detection signal lines 25 and 26.

In FIG. 8A, a circuit configuration of the communication apparatus 100 is the same as in FIG. 4A. As shown in FIG. 8A, the shell 43 of the USB plug 23 is grounded. Therefore, when the USB plug 23 is improperly connected to the Ethernet connector 1, the pins CP2 to CP7 of the Ethernet connector 1, which are connected with the shell 43, are grounded. As described above, the voltage detection circuit 9 receives voltage level signals from the pins CP4 and CP6, and generates the state detection signals SD1 and SD2 based on the voltage level signals received from the pins CP4 and CP6. As shown in FIG. 8B, when the USB plug 23 is improperly connected to the Ethernet connector 1, the voltage detection circuit 9 sends the state detection signals SD1 and SD2 that both have voltage levels of 0 V to the controller 10, through the detection signal lines 25 and 26.

The controller 10 receives the state detection signals SD1 and SD2 from the voltage detection circuit 9 through the detection signal lines 25 and 26, and determines that the USB plug 23 is improperly connected to the Ethernet connector 1, based on the voltage levels of the state detection signals SD1 and SD2. Then, the controller 10 sends the results of the determination, i.e., the improper connection state, to the warning circuit 16, which notifies the user of the determination results. At this time, the warning circuit 16 also notifies the user of the type of the communication plug that is improperly connected, that is, USB PLUG.

Figure 9:
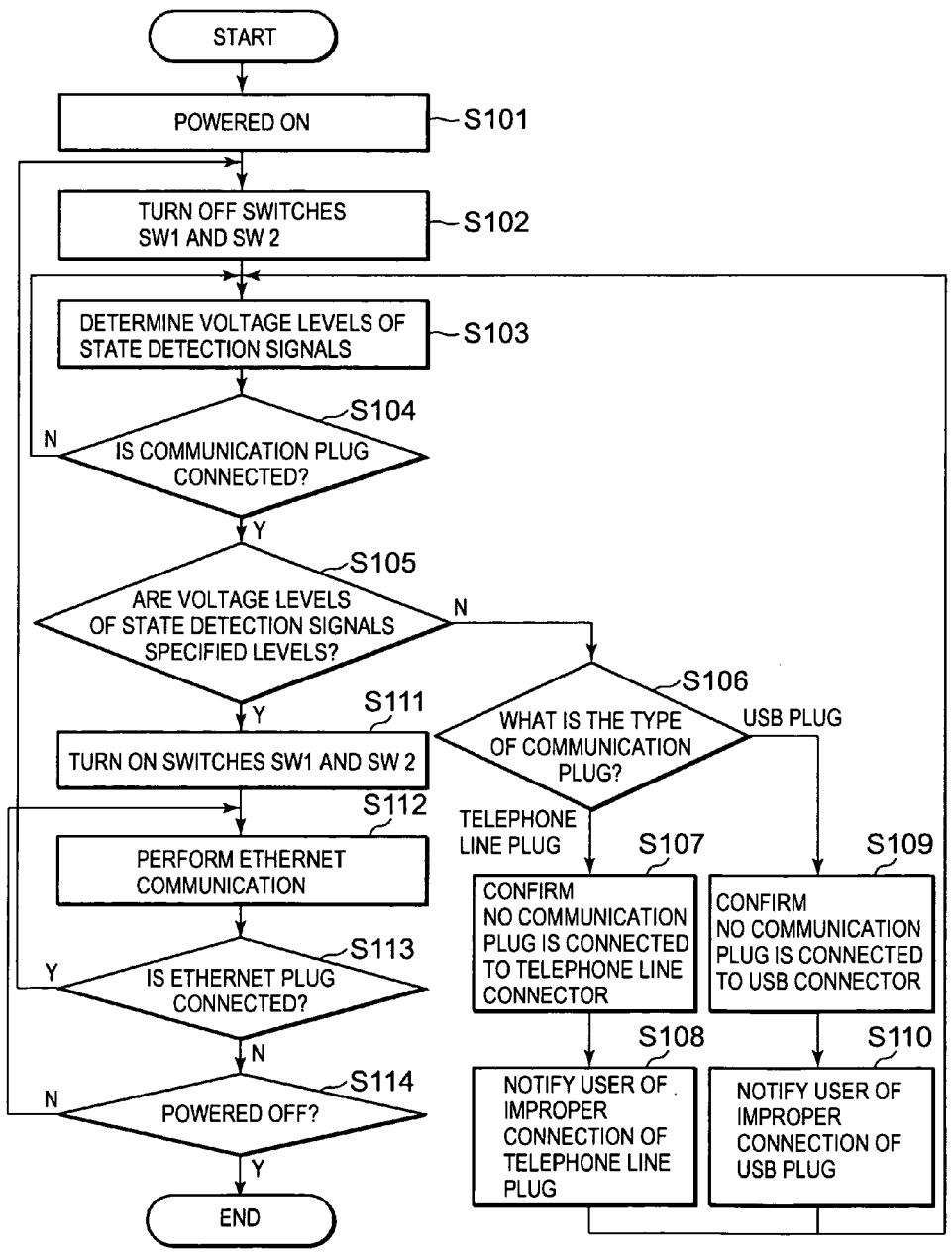
FIG. 9 is a flow chart of a connection control operation of the communication apparatus of the first embodiment.

Next, a connection control operation of the communication apparatus 100 will be described with reference to FIG. 9. FIG. 9 is a flow chart of the connection control operation of the communication apparatus 100.

At S101, the communication apparatus 100 is powered on.

At S102, the controller 10 turns off the switches SW1 and SW2 of the connection circuit 8 through the ON-OFF signal line 24.

At S103, the controller 10 determines voltage levels of the state detection signals SD1 and SD2 sent from the voltage detection circuit 9 through the detection signal lines 25 and 26.

At S104, the controller 10 determines a connection state of a communication plug relative to the Ethernet connector 1 based on the voltage levels of the state detection signals SD1 and SD2. As described above, the voltage detection circuit 9 receives voltage level signals from the pins CP4 and CP6 of the Ethernet connector 1, and generates the state detection signals SD1 and SD2 based on the voltage level signals received from the pins CP4 and CP6. The controller 10 receives the state detection signals SD1 and SD2 from the voltage detection circuit 9. When the voltage levels of the state detection signals SD1 and SD2 are respectively 2.5 V and 0.39 V, the controller 10 determines that no communication plug is connected to the Ethernet connector 1, that is, the connection state is the non-connection state. Then, the process returns to S103. In other cases, the controller 10 determines that some kind of a communication plug is connected to the Ethernet connector 1. Then, the process proceeds to S105.

At S105, the controller 10 determines whether the voltage levels of the state detection signals SD1 and SD2 are specified levels or not. When the voltage levels of the state detection signals SD1 and SD2 are respectively 2.5 V and 0 V, the controller 10 determines that the Ethernet plug 21 is normally connected to the Ethernet connector 1, that is, the connection state is the normal connection state. Then, the process proceeds to S111. In other cases, the controller 10 determines that some kind of a communication plug other than the Ethernet plug 21 is improperly connected to the Ethernet connector 1, that is, the connection state is the improper connection state. Then, the process proceeds to S106.

At S106, the controller 10 identifies the type of the communication plug that is improperly connected to the Ethernet connector 1. When the voltage levels of the state detection signals SD1 and SD2 are respectively 2.5 V and 4.76 V, the controller 10 determines that the telephone line plug 22 is improperly connected to the Ethernet connector 1. Then, the process proceeds to S107. On the other hand, when the voltage levels of the state detection signals SD1 and SD2 are both 0 V, the controller 10 determines that the USB plug 23 is improperly connected to the Ethernet connector 1. Then, the process proceeds to S109.

At S107, the controller 10 determines that telephone line communication cannot be performed, and confirms that no communication plug is connected to the telephone line connector 2.

At S108, the controller 10 sends the determination results obtained at S105, or the improper connection state, to the warning circuit 16. In addition, the controller 10 also sends information on the type of the communication plug that is improperly connected to the Ethernet plug 21, or TELEPHONE LINE PLUG, to the warning circuit 16. The warning circuit 16 notifies the user of the determination results and the information on the type of the communication plug. Then, the process returns to S103.

At S109, the controller 10 determines that USB communication cannot be performed, and confirms that no communication plug is connected to the USB connector 3.

At S110, the controller 10 sends the determination results obtained at S105, or the improper connection state, to the warning circuit 16. In addition, the controller 10 also sends information on the type of the communication plug that is improperly connected to the Ethernet plug 21, or USB PLUG, to the warning circuit 16. The warning circuit 16 notifies the user of the determination results and the information on the type of the communication plug. Then, the process returns to S103.

At S111, the controller 10 turns, on the switches SW1 and SW2 of the connection circuit 8 through the ON-OFF signal line 24.

At S112, the controller 10 instructs the Ethernet communication circuit 11 to perform Ethernet communication.

At S113, after the Ethernet communication has been performed, the controller 10 confirms whether the Ethernet plug 21 is still connected to the Ethernet connector 1 or not. When the voltage levels of the state detection signals SD1 and SD2 are respectively 2.5 V and 0.39 V, the controller 10 determines that the Ethernet plug 21 is no longer connected to the Ethernet connector 1, that is, the connection state is the non-connection state. Then, the process proceeds to S114. When the voltage levels of the state detection signals SD1 and SD2 are respectively 2.5 V and 0 V, the controller 10 determines that the Ethernet plug 21 is still connected to the Ethernet connector 1, that is, the connection state is the normal connection state. Then, the process returns to S102.

At S114, the controller 10 determines whether the communication apparatus 100 is powered off or not. When the controller 10 determines that the communication apparatus 100 is powered off, the communication apparatus 100 terminates the connection control operation thereof. On the other hand, when the controller 10 determines that the communication apparatus 100 is still powered on, the process returns to S112.

In the first embodiment, the switches SW1 and SW2 are provided to two signal lines of multiple signal lines connected with the Ethernet connector 1. However, a switch may be provided to each of the multiple signal lines connected with the Ethernet connector 1.

This invention may be applicable to any communication connector to which a communication plug is capable of being physically connected by mistake. In this case, the connection circuit 8 is provided between the communication connector and a communication circuit, and the voltage detection circuit 9 is provided between the connection circuit 8 and the controller 10. The voltage detection circuit 9 generates state detection signals that represent a connection state of the communication plug relative to the communication connector, and sends the state detection signals to the controller 10. The controller 10 determines the connection state of the communication plug, i.e., the normal connection state, the improper connection state and the non-connection state, based on the state detection signals sent from the voltage detection circuit 9.

In addition, in the first embodiment, the voltage detection circuit 9 receives voltage level signals from predetermined pins of the Ethernet connector 1, and generates the state detection signals based on the voltage level signals. The controller 10 determines the connection state of the communication plug based on the voltage levels of the state detection signals. However, the voltage detection circuit 9 may receive signals other than the voltage level signals from the predetermined pins of the Ethernet connector 1, and the controller 10 may determine the connection state of the communication plug, based on periods or response timing of the signals.

As described above, in the first embodiment, the connection circuit 8 is provided between the Ethernet communication circuit 11 and the Ethernet connector 1, and the voltage detection circuit 9 is provided between the connection circuit 8 and the controller 10. The controller 10 controls an ON-OFF operation of the connection circuit 8, and determines the connection state of a communication plug, i.e., the normal connection state, the improper connection state and the non-connection state, based on the state detection signals sent from the voltage detection circuit 9. Therefore, the communication apparatus 100 can detect improper connection between the Ethernet connector 1 and the communication plug, such as the telephone line plug 22 or the USB plug 23, thereby preventing a malfunction of the Ethernet communication circuit 11.

Moreover, the voltage detection circuit 9 incorporates the power supply VDD1 (5 V) therein. Therefore, the communication apparatus 100 can identify the type of the communication plug that is improperly connected to the Ethernet connector 1 in addition to determination of the connection state. This feature further aids a user in establishing a normal connection state.

Second Embodiment

Figure 10:
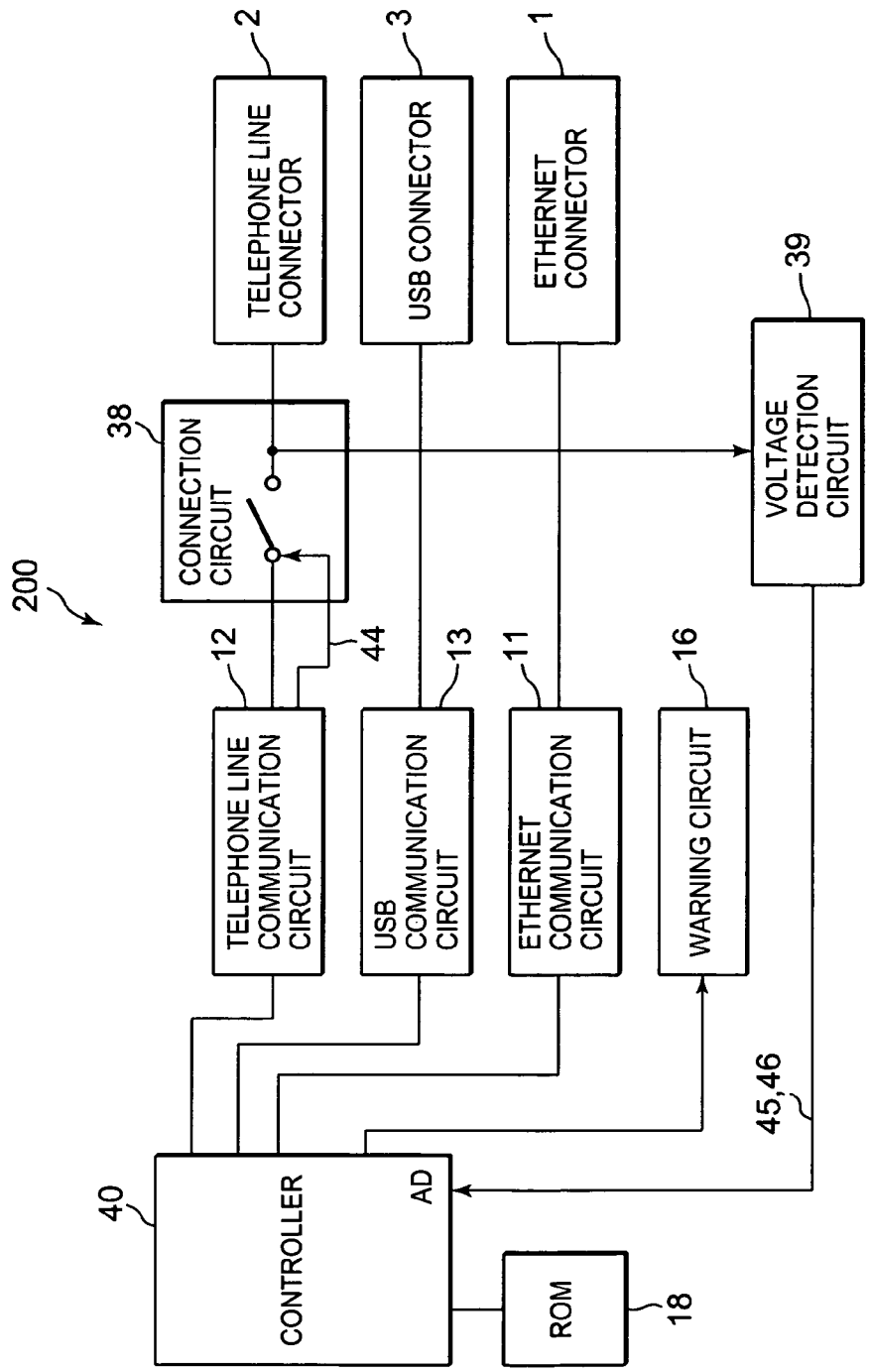
FIG. 10 is a schematic block diagram of a communication apparatus of a second embodiment.

FIG. 10 is a schematic block diagram of a communication apparatus 200 of a second embodiment, in which the connection circuit 8, the voltage detection circuit 9 and the controller 10 of the communication apparatus 100 of the first embodiment are respectively replaced with a connection circuit 38, a voltage detection circuit 39 and a controller 40. The other elements are the same as those in the first embodiment. Therefore, elements similar to those in the first embodiment have been given the same numerals and their description is partially omitted.

Referring to FIG. 10, as in the communication apparatus 100 of the first embodiment, the Ethernet plug 21, the telephone line plug 22 and the USB plug 23 are respectively connected to the Ethernet connector 1, the telephone line connector 2 and the USB connector 3. The connection circuit 38 as a connection section is connected with the telephone line connector 2, the telephone line communication circuit 12 and the voltage detection circuit 39 through signal lines. The connection circuit 38 and the telephone line communication circuit 12 are also connected through an ON-OFF signal line 44. The voltage detection circuit 39 as a state detector is connected with the connection circuit 38 and the controller 40. The voltage detection circuit 39 generates state detection signals that represent a connection state of a communication plug relative to the telephone line connector 2, i.e., a normal connection state, an improper connection state and a non-connection state, and sends the state detection signals to a terminal AD of the controller 40 through detection signal lines 45 and 46.

The controller 40 is connected with the voltage detection circuit 39, the Ethernet communication circuit 11, the telephone line communication circuit 12, the USB communication circuit 13, the warning circuit 16 and the ROM 18. The Ethernet communication circuit 11 as an Ethernet communication section is connected with the Ethernet connector 1 through signal lines, and controls Ethernet communication performed through the Ethernet connector 1. The telephone line communication circuit 12 as a telephone line communication section is connected with the telephone line connector 2 through signal lines and the connection circuit 38, and controls telephone line communication performed through the telephone line connector 2. The USB communication circuit 13 as a USB communication section is connected with the USB connector 3 through signal lines, and controls USB communication with a USB device. The warning circuit 16 as a warning section may include a buzzer, an LED, a lamp, a liquid crystal display panel and the like, and visually or audibly notifies a user of the connection state of the communication plug, i.e., the normal connection state, the improper connection state and the non-connection state, under the control of the controller 40. In addition, the warning circuit 16 also notifies the user of the type of the communication plug when the communication plug is in the improper connection state, as described later.

The ROM 18 as a memory stores various control programs executed by the controller 40. The controller 40 controls the entire communication apparatus 200 and each of the aforementioned elements by using the control programs. The controller 40, for instance, instructs the telephone line communication circuit 12 to control an ON-OFF action of the connection circuit 38 through the ON-OFF signal line 44.

Figure 11:
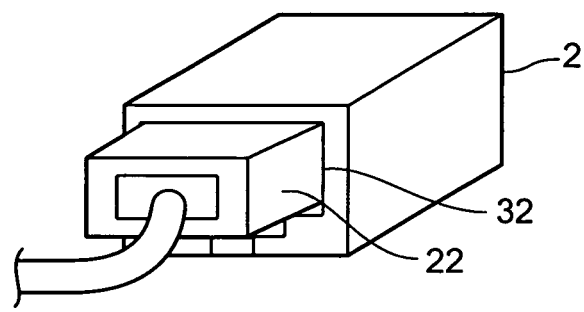
FIG. 11 is a perspective view showing a state where the telephone line plug is normally connected to a telephone line connector.

FIG. 11 is a perspective view showing a state where the telephone line plug 22 is normally connected to the telephone line connector 2. In FIG. 11, the telephone line plug 22, which is the typical RJ-11 type communication plug, is normally connected to the telephone line plug inlet 32 of the telephone line connector 2.

Figures 12A, 12B:
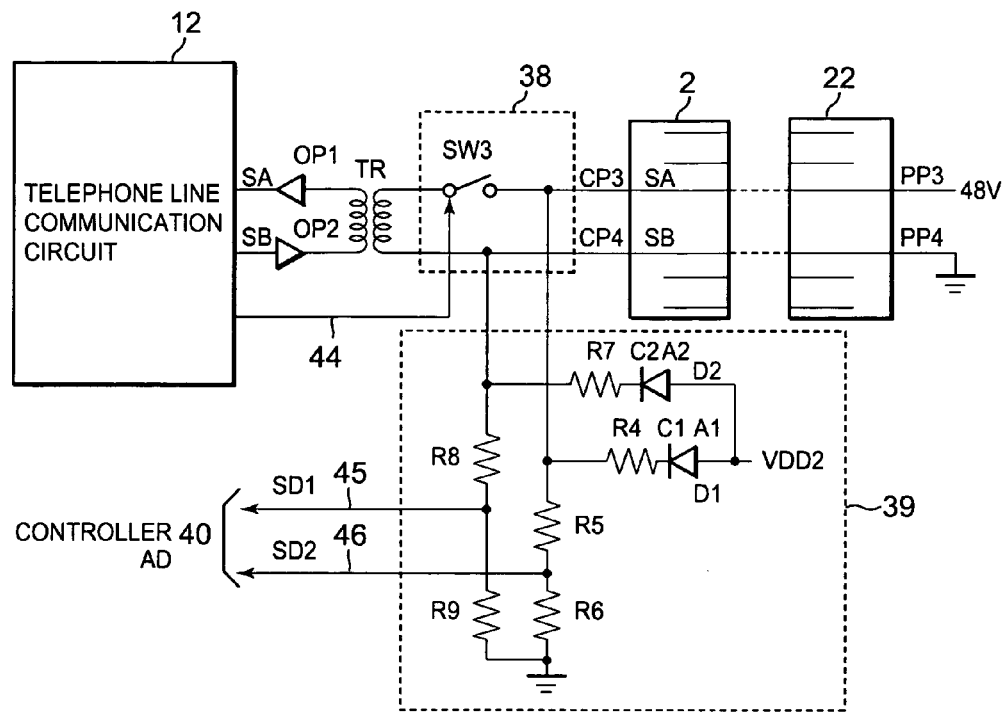
FIG. 12A is a circuit diagram in the state where the telephone line plug is normally connected to the telephone line connector.
FIG. 12B is a list showing voltage levels of state detection signals sent on detection signal lines.

FIG. 12A is a circuit diagram in the state where the telephone line plug 22 is normally connected to the telephone line connector 2. FIG. 12B is a list showing voltage levels of the state detection signals SD1 and SD2, respectively sent on the detection signal lines 45 and 46.

Referring to FIG. 12A, the telephone line communication circuit 12 and both ends of a secondary side of a transformer TR are connected with each other through operational amplifiers OP1 and OP2, and signal lines SA and SB. One end of a primary side of the transformer TR is connected with one end of a switch SW3 of the connection circuit 38. The switch SW3 is operated by the telephone line communication circuit 12 through the ON-OFF signal line 44. The switch SW3 may be an electromagnetic switch, a solid-state switch, an electromagnetic relay, a solid-state relay or the like.

The voltage detection circuit 39 includes a first resistor R4 (1.1 kΩ), a second resistor R5 (10 kΩ), a third resistor R6 (1.1 kΩ), a fourth resister R7 (1.1 kΩ), a fifth resister R8 (10 kΩ), a sixth resister R9 (1.1 kΩ), a first diode D1, a second diode D2 and a power supply VDD2 (5 V). The other end of the switch SW3 is connected with a pin CP3 of the telephone line connector 2, one end of the first resistor R4 (1.1 kΩ) and one end of the second resistor R5 (10 kΩ). The other end of the first resistor R4 (1.1 kΩ) is connected with a cathode terminal C1 of the first diode D1, and an anode terminal Al of the first diode D1 is connected with the power supply VDD2 (5 V). The other end of the second resister R5 (10 kΩ) is connected with one end of the third resistor R6 (1.1 kΩ) and one end of the detection signal line 46. The other end of the third resistor R6 (1.1 kΩ) is grounded and the other end of the detection signal line 46 is connected with the terminal AD of the controller 40.

It should be noted that when the telephone line plug 22 is normally connected to the telephone line connector 2 in a normal connection state A, described later, and a voltage of 48 V is provided to the pin CP3 of the telephone line connector 2, the first diode D1 prevents a reverse current from flowing into the power supply VDD2 (5 V). That is, the first diode D1 serves as a protection element. Also, it should be noted that the first resistor R4 (1.1 kΩ) limits the reverse current. That is, the first resistor R4 (1.1 kΩ) serves as a current-limiting resistor.

The other end of the primary side of the transformer TR is connected with a pin CP4 of the telephone line connector 2, one end of the fourth resistor R7 (1.1 kΩ) and one end of the fifth resistor R8 (10 kΩ). The other end of the fourth resistor R7 (1.1 kΩ) is connected with a cathode terminal C2 of the second diode D2, and an anode terminal A2 of the second diode D2 is connected with the power supply VDD2 (5 V). The other end of the fifth resister R8 (10 kΩ) is connected with one end of the sixth resistor R9 (1.1 kΩ) and one end of the detection signal line 45. The other end of the sixth resistor R9 (1.1 kΩ) is grounded and the other end of the detection signal line 45 is connected with the terminal AD of the controller 40.

It should be noted that when the telephone line plug 22 is normally connected to the telephone line connector 2 in a normal connection state B, described later, and a voltage of 48 V is provided to the pin CP4 of the telephone line connector 2, the second diode D2 prevents a reverse current from flowing into the power supply VDD2 (5 V). That is, the second diode D2 serves as a protection element. Also, it should be noted that the fourth resistor R7 (1.1 kΩ) limits the reverse current. That is, the fourth resistor R7 (1.1 kΩ) serves as a current-limiting resistor.

As shown in FIG. 12A, pins PP3 and PP4 of the telephone line plug 22 respectively correspond to the pins CP 3 and CP4 of the telephone line connector 2. The pin PP3 of the telephone line plug 22 is connected with a voice signal line, which provides a telephone with a direct voltage of 48 V for operating the telephone and communicates a voice-band signal superimposed on the direct voltage of 48 V. The pin PP4 of the telephone line plug 22 is connected to ground by a ground line. Referring to FIG. 12A, the voice signal line (48 V) and the ground line are respectively connected with the signal lines SA and SB. Hereinafter, this state is defined as the normal connection state A. On the contrary, the voice signal line (48 V) and the ground line may be respectively connected with the signal lines SB and SA. Hereinafter, this state is defined as the normal connection state B.

As described above, the pins CP3 and CP4 of the telephone line connector 2 are connected with the voltage detection circuit 39. The voltage detection circuit 39 receives voltage level signals corresponding to the connection state of the communication plug relative to the telephone line connector 2 from the pins CP3 and CP4. The voltage detection circuit 39 generates the state detection signals SD1 and SD2 based on the voltage level signals received from the pins CP3 and CP4, and sends them to the controller 40 through the detection signal lines 45 and 46.

As shown in FIG. 12A, when the telephone line plug 22 is connected to the telephone line connector 2 in the normal connection state A, the voltage detection circuit 39 sends the state detection signal SD1 that has a voltage level of 0 V and the state detection signal SD2 that has a voltage level of 4.76 V to the controller 40, through the detection signal lines 45 and 46, as shown in FIG. 12B. On the other hand, when the telephone line plug 22 is connected to the telephone line connector 2 in the normal connection state B, the voltage detection circuit 39 sends the state detection signal SD1 that has a voltage level of 4.76 V and the state detection signal SD2 that has a voltage level of 0 V to the controller 40, through the detection signal lines 45 and 46, as shown in FIG. 12B. Moreover, when the telephone line plug 22 is not connected to the telephone line connector 2, the voltage detection circuit 39 sends the state detection signals SD1 and SD2 that both have voltage levels of 0.39 V to the controller 40, through the detection signal lines 45 and 46. In this embodiment, a two-wire telephone line is taken as an example of the telephone line, which is attached to the telephone line plug 22 of the RJ-11 type. However, the telephone line may be a four-wire telephone line or a six-wire telephone line having higher functions.

Figure 13:
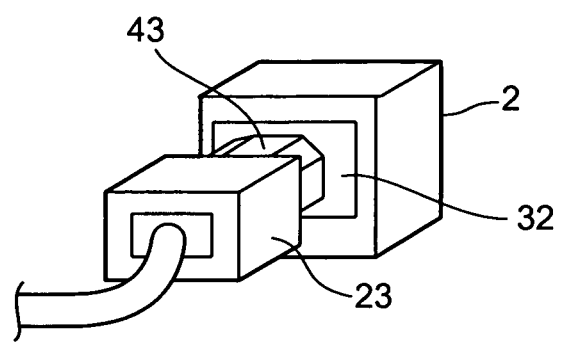
FIG. 13 is a perspective view showing a state where the USB plug is improperly connected to the telephone line connector.

FIG. 13 is a perspective view showing a state where the USB plug 23 is improperly connected to the telephone line connector 2. In FIG. 13, the shell 43 of the USB plug 23 of the USB-B type, which meets the USB 1.1 standard, is improperly connected to the telephone line plug inlet 32 of the telephone line connector 2.

Figures 14A, 14B:
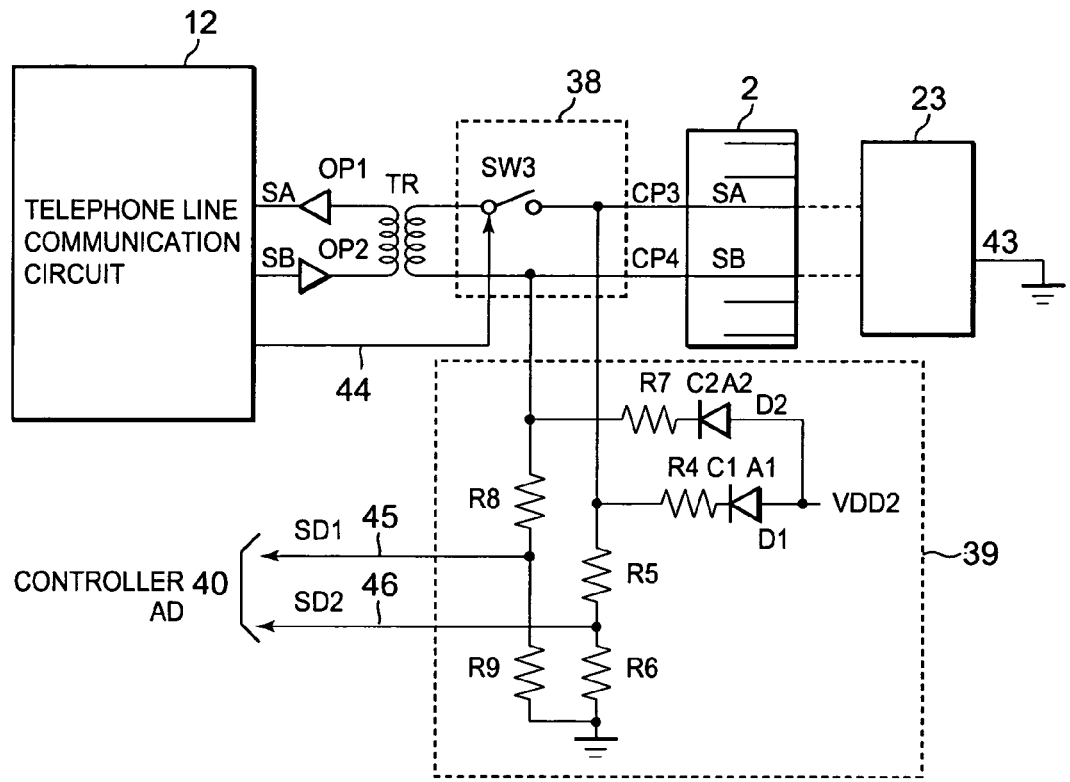
FIG. 14A is a circuit diagram in the state where the USB plug is improperly connected to the telephone line connector.
FIG. 14B is a list showing voltage levels of the state detection signals sent on the detection signal lines.

FIG. 14A is a circuit diagram in the state where the USB plug 23 is improperly connected to the telephone line connector 2. FIG. 14B is a list showing voltage levels of the state detection signals SD1 and SD2, respectively sent on the detection signal lines 45 and 46.

In FIG. 14A, a circuit configuration of the communication apparatus 200 is the same as in FIG. 12A. As shown in FIG. 12A, the shell 43 of the USB plug 23 is grounded. Therefore, when the USB plug 23 is improperly connected to the telephone line connector 2, the pins CP3 and CP4 of the telephone line connector 2, which are connected with the shell 43, are grounded. As described above, the voltage detection circuit 39 receives voltage level signals from the pins CP3 and CP4, and generates the state detection signals SD1 and SD2 based on the voltage level signals received from the pins CP3 and CP4. As shown in FIG. 14B, when the USB plug 23 is improperly connected to the telephone line connector 2, the voltage detection circuit 39 sends the state detection signals SD1 and SD2 that both have voltage levels of 0 V to the controller 40, through the detection signal lines 45 and 46.

The controller 40 receives the state detection signals SD1 and SD2 from the voltage detection circuit 39 through the detection signal lines 45 and 46, and determines that the USB plug 23 is improperly connected to the telephone line connector 2, based on the voltage levels of the state detection signals SD1 and SD2. Then, the controller 40 sends the results of the determination, i.e., the improper connection state, to the warning circuit 16, which notifies the user of the determination results. At this time, the warning circuit 16 also notifies the user of the type of the communication plug that is improperly connected, that is, USB PLUG.

Figure 15:
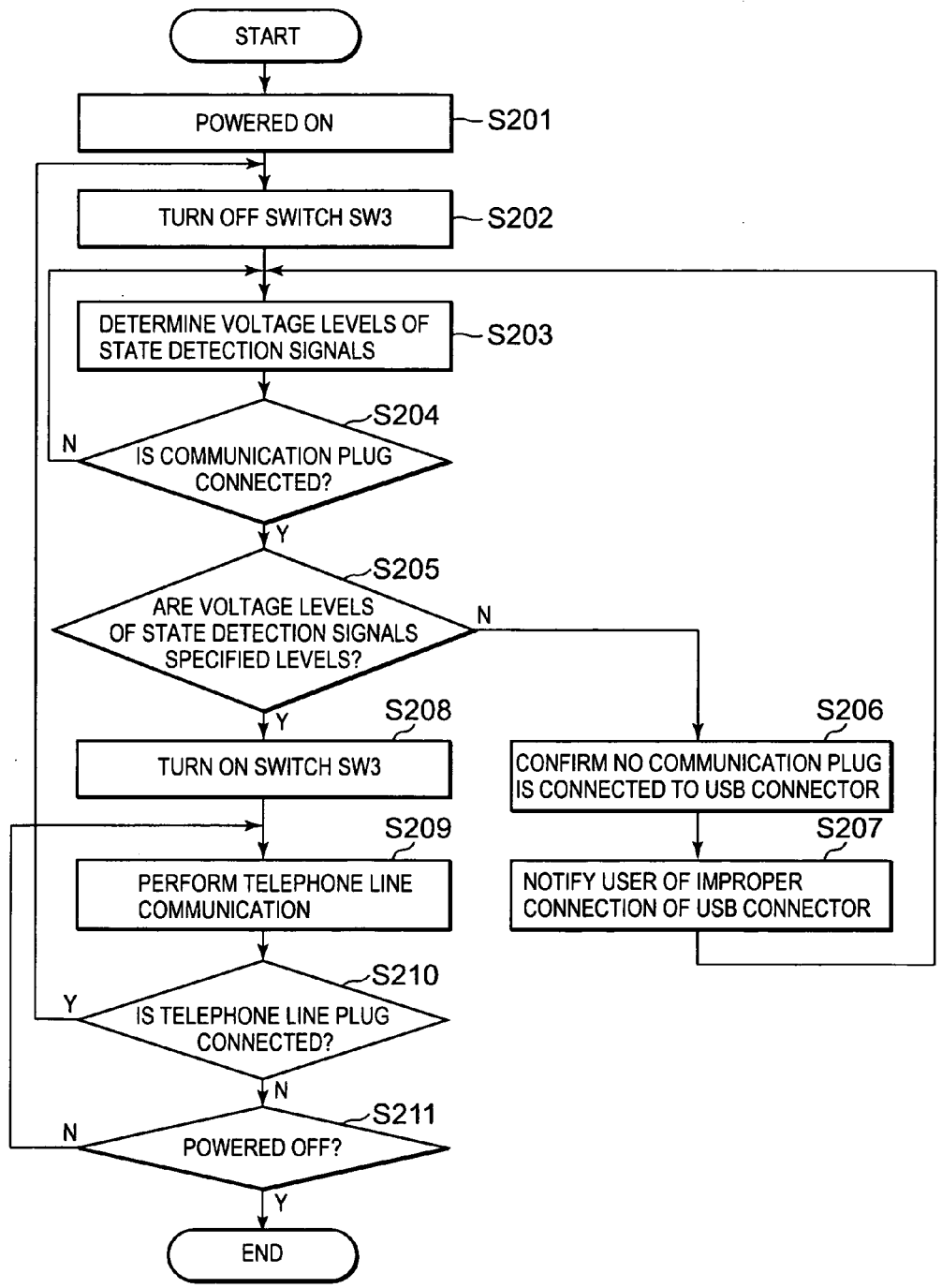
FIG. 15 is a flow chart of a connection control operation of the communication apparatus of the second embodiment.

Next, a connection control operation of the communication apparatus 200 will be described with reference to FIG. 15. FIG. 15 is a flow chart of the connection control operation of the communication apparatus 200.

At S201, the communication apparatus 200 is powered on.

At S202, the controller 40 instructs the telephone line communication circuit 12 to turn off the switch SW3 of the connection circuit 38 through the ON-OFF signal line 44.

At S203, the controller 40 determines voltage levels of the state detection signals SD1 and SD2 sent from the voltage detection circuit 39 through the detection signal lines 45 and 46.

At S204, the controller 40 determines a connection state of a communication plug relative to the telephone line connector 2 based on the voltage levels of the state detection signals SD1 and SD2. As described above, the voltage detection circuit 39 receives voltage level signals from the pins CP3 and CP4 of the telephone line connector 2, and generates the state detection signals SD1 and SD2 based on the voltage level signals received from the pins CP3 and CP4. The controller 40 receives the state detection signals SD1 and SD2 from the voltage detection circuit 39. When the voltage levels of the state detection signals SD1 and SD2 are both 0.39 V, the controller 40 determines that no communication plug is connected to the telephone line connector 2, that is, the connection state is the non-connection state. Then, the process returns to S203. In other cases, the controller 40 determines that some kind of a communication plug is connected to the telephone line connector 2. Then, the process proceeds to S205.

At S205, the controller 40 determines whether the voltage levels of the state detection signals SD1 and SD2 are specified levels or not. When the voltage levels of the state detection signals SD1 and SD2 are respectively 0 V and 4.76 V, the controller 40 determines that the telephone line plug 22 is connected to the telephone line connector 2 in the normal connection state A. On the other hand, when the voltage levels of the state detection signals SD1 and SD2 are respectively 4.76 V and 0 V, the controller 40 determines that the telephone line plug 22 is connected to the telephone line connector 2 in the normal connection state B. The controller 40 determines that the telephone line plug 22 is normally connected to the telephone line connector 2 in either case. Then, the process proceeds to S208. In other cases, the controller 40 determines that the USB plug 23 is improperly connected to the telephone line connector 2, that is, the connection state is the improper connection state. Then, the process proceeds to S206.

At S206, the controller 40 determines that USB communication cannot be performed, and confirms that no communication plug is connected to the USB connector 3.

At S207, the controller 40 sends the determination results obtained at S205, or the improper connection state, to the warning circuit 16. In addition, the controller 40 also sends information on the type of the communication plug that is improperly connected to the telephone line plug 22, or USB PLUG, to the warning circuit 16. The warning circuit 16 notifies the user of the determination results and the information on the type of the communication plug. Then, the process returns to S203.

At S208, the controller 40 instructs the telephone line communication circuit 12 to turn on the switch SW3 of the connection circuit 38 through the ON-OFF signal line 44.

At S209, the controller 40 instructs the telephone line communication circuit 12 to perform telephone line communication.

At S210, after the telephone line communication has been performed, the controller 40 confirms whether the telephone line plug 22 is still connected to the telephone line connector 2 or not. When the voltage levels of the state detection signals SD1 and SD2 are both 0.39 V, the controller 40 determines that the telephone line plug 22 is no longer connected to the telephone line connector 2, that is, the connection state is the non-connection state. Then, the process proceeds to S211. When the voltage levels of the state detection signals SD1 and SD2 are respectively 0 V and 4.76 V, the controller 40 determines that the telephone line plug 22 is connected to the telephone line connector 2 in the normal connection state A. On the other hand, when the voltage levels of the state detection signals SD1 and SD2 are respectively 4.76 V and 0 V, the controller 40 determines that the telephone line plug 22 is connected to the telephone line connector 2 in the normal connection state B. The controller 40 determines that the telephone line plug 22 is still normally connected to the telephone line connector 2 in either case. Then, the process returns to S202.

At S211, the controller 40 determines whether the communication apparatus 200 is powered off or not. When the controller 40 determines that the communication apparatus 200 is powered off, the communication apparatus 200 terminates the connection control operation thereof. On the other hand, when the controller 40 determines that the communication apparatus 200 is still powered on, the process returns to S209.

This invention may be applicable to any communication connector to which a communication plug is capable of being physically connected by mistake. In this case, the connection circuit 38 is provided between the communication connector and a communication circuit, and the voltage detection circuit 39 is provided between the connection circuit 38 and the controller 40. The voltage detection circuit 39 generates state detection signals that represent a connection state of the communication plug relative to the communication connector, and sends the state detection signals to the controller 40. The controller 40 determines the connection state of the communication plug, i.e., the normal connection state, the improper connection state and the non-connection state, based on the state detection signals sent from the voltage detection circuit 39.

In addition, in the second embodiment, the voltage detection circuit 39 receives voltage level signals from predetermined pins of the telephone line connector 2, and generates the state detection signals based on the voltage level signals. The controller 40 determines the connection state of the communication plug based on the voltage levels of the state detection signals. However, the voltage detection circuit 39 may receive signals other than the voltage level signals from the predetermined pins of the telephone line connector 2, and the controller 40 may determine the connection state of the communication plug, based on periods or response timing of the signals.

As described above, in the second embodiment, the connection circuit 38 is provided between the telephone line communication circuit 12 and the telephone line connector 2, and the voltage detection circuit 39 is provided between the connection circuit 38 and the controller 40. The controller 40 instructs the telephone line communication circuit 12 to control an ON-OFF operation of the switch SW3, which is connected with one end of the primary side of the transformer TR, of the connection circuit 38, and determines the connection state of a communication plug, i.e., the normal connection state, the improper connection state and the non-connection state, based on the state detection signals sent from the voltage detection circuit 39. Therefore, the communication apparatus 200 can detect an improper connection between the telephone line connector 2 and the communication plug, such as the USB plug 23, thereby preventing a malfunction of the telephone line communication circuit 12.

Moreover, the voltage detection circuit 39 incorporates the power supply VDD2 (5 V) therein. Therefore, the communication apparatus 200 can identify the type of the communication plug that is improperly connected to the telephone line connector 2 in addition to determination of the connection state. This feature further aids a user in establishing a normal connection state.

While the first and second embodiments has been respectively described with respect to an Ethernet connector and a telephone line connector, the invention may be applicable to multiple communication connectors at the same time in a multifunction peripheral (MFP) that has various functions, such as a modem function, a facsimile function and the like. In addition, this invention may be applicable to any communication connector to which a communication plug is liable to be physically connected by mistake.

The communication apparatus and the connection control method being thus described, it will be apparent that the same may be varied in many ways. Such variations are not to be regarded as a departure from the sprit and scope of the invention, and all such modifications as would be apparent to one of ordinary skill in the art are intended to be included within the scope of the following claims.

What is claimed is:

1. A communication apparatus comprising:
    a communication connector to which a communication plug is capable of being connected;
    a communication section configured to control communication performed through the communication connector;
    a connection section configured to connect the communication connector and the communication section;
    a state detector in communication with the connection section and configured to generate a state detection signal corresponding to a connection state of the communication plug relative to the communication connector;
    a controller in communication with the state detector and configured to determine which of a normal connection state, an improper connection state and a non-connection state the communication plug is in based on the state detection signal, and configured to control an ON-OFF operation of the connection section, wherein when the communication apparatus is initially powered on, the controller and the state detector are turned on, and the controller turns off the connection section, and wherein the controller turns on the connection section after the controller determines that the communication plug is in the normal connection state; and
    a warning section in communication with the controller and configured to notify a user of results determined by the controller.

2. The communication apparatus according to claim 1, wherein the state detector receives a voltage level signal corresponding to the connection state of the communication plug, and generates the state detection signal based on the voltage level signal.

3. The communication apparatus according to claim 1, wherein the communication connector is an Ethernet connector.

4. The communication apparatus according to claim 1, wherein the communication connector is a telephone line connector.

5. The communication apparatus according to claim 2, wherein the state detector includes a power supply, a diode having an anode terminal connected with the power supply, a first resistor having one end connected with a cathode terminal of the diode, a second resistor having one end connected with a second end of the first resistor, and a third resistor having one end connected with a second end of the second resistor and a second end that is grounded, wherein
    a predetermined pin of the communication connector and a first connection point between the first resistor and the second resistor are connected with each other, and the controller and a second connection point between the second resistor and the third resistor are connected with each other.

6. The communication apparatus according to claim 2, wherein the state detector includes a power supply, a first diode having an anode terminal connected with the power supply, a first resistor having one end connected with a cathode terminal of the first diode, a second resistor having one end connected with a second end of the first resistor, a third resistor having one end connected with a second end of the second resistor and a second end that is grounded, a second diode having an anode terminal connected with the power supply, a fourth resistor having one end connected with a cathode terminal of the second diode, a fifth resistor having one end connected with a second end of the fourth resistor, and a sixth resistor having one end connected with a second end of the fifth resistor and a second end that is grounded, wherein
    a first pin of the communication connector and a first connection point between the first resistor and the second resistor are connected with each other, and the controller and a second connection point between the second resistor and the third resistor are connected with each other, and a second pin of the communication connector and a third connection point between the fourth resistor and the fifth resistor are connected with each other, and the controller and a fourth connection point between the fifth resistor and the sixth resistor are connected with each other.

7. The communication apparatus according to claim 2, wherein the state detector includes a power supply that enables the state detector to generate the state detection signal and to thereby enable the controller to determine a type of communication plug that is connected to the communication connector in the improper connection state.

8. The communication apparatus according to claim 7, wherein the state detector further includes a protection element for preventing a reverse current from flowing into the power supply in the improper connection state.

9. A connection control method performed by a communication apparatus that includes a communication connector to which a communication plug is capable of being connected, a communication section that controls communication performed through the communication connector, a connection section that connects the communication connector and the communication section, a state detector that generates a state detection signal corresponding to a connection state of the communication plug relative to the communication connector, and a controller that determines the connection state of the communication plug based on the state detection signal, the method comprising:
turning off the connection section when the state detector and the controller are initially powered on;
generating the state detection signal corresponding to the connection state of the communication plug relative to the communication connector, while the connection section is turned off;
determining which of a normal connection state, an improper connection state and a non-connection state the communication plug is in based on the state detection signal;
notifying a user of results of the determining; and
turning on the connection section after the controller determines that the communication plug is in the normal connection state.

10. The connection control method according to claim 9, further comprising receiving a voltage level signal corresponding to the connection state of the communication plug relative to the communication connector,
wherein the generating of a state detection signal is based on the voltage level signal.

11. The connection control method according to claim 9, further comprising determining a type of communication plug that is connected to the communication connector in the improper connection state based on the state detection signal when it is determined that the communication plug is in the improper connection state.

12. In a communication apparatus that includes a communication connector to which a communication plug is capable of being connected, a communication section that controls communication performed through the communication connector, a connection section that connects the communication connector and the communication section, a state detector that generates a state detection signal corresponding to a connection state of the communication plug relative to the communication connector, and a controller that determines the connection state of the communication plug based on the state detection signal, a method of determining a state of the communication plug relative to the communication connector, the method comprising:
turning off the connection section when the state detector and the controller are initially powered on
receiving a voltage level signal from the communication connector while the connection section is turned off; and
generating the state detection signal, based on the received voltage level signal while the connection section is turned off, wherein
the state detection signal corresponds to one of a normal connection state, an improper connection state and a non-connection state of the communication plug relative to the communication connector, and
the state detection signal also enables a type of communication plug to be determined when the communication plug is connected to the communication connector in the improper connection state.

13. In a communication apparatus that includes a communication connector to which a communication plug is capable of being connected, a communication section that controls communication performed through the communication connector, a connection section that connects the communication connector and the communication section, a state detector that generates a state detection signal corresponding to a connection state of the communication plug relative to the communication connector, and a controller that determines the connection state of the communication plug based on the state detection signal, a connection control method comprising:
turning off the connection section when the state detector and the controller are initially powered on;
receiving the state detection signal generated while the connection section is turned off, in response to the connection state of the communication plug relative to the communication connector;
determining which of a normal connection state, an improper connection state and a non-connection state the communication plug is in based on the state detection signal;
notifying a user of results of the determining; and
turning on the connection section after the controller determines that the communication plug is in the normal connection state.

14. The connection control method according to claim 13, further comprising determining a type of communication plug that is connected to the communication connector in the improper connection state based on the state detection signal when it is determined that the communication plug is in the improper connection state.

15. The connection control method according to claim 13, wherein the notifying a user of results of the determining comprises enabling a warning to be generated when it is determined that the communication plug is in the improper connection state.

16. The communication apparatus according to claim 1, wherein the improper connection state indicates that the communication plug has been connected to a communication connector different in standard from the communication plug.

17. The connection control method according to claim 9, wherein the improper connection state indicates that the communication plug has been connected to a communication connector different in standard from the communication plug.

18. The method according to claim 12, wherein the improper connection state indicates that the communication plug has been connected to a communication connector different in standard from the communication plug.

19. The connection control method according to claim 13, wherein the improper connection state indicates that the communication plug has been connected to a communication connector different in standard from the communication plug.

* * * * *